United States Patent [19]
Lee et al.

[11] Patent Number: 5,952,126
[45] Date of Patent: Sep. 14, 1999

[54] POLYMER SOLID ELECTROLYTE AND LITHIUM SECONDARY CELL ADOPTING THE SAME

[75] Inventors: Doo-yeon Lee, Uiwang; Sang-hyun Sung, Seoul, both of Rep. of Korea; Yasumasa Hirai, Kyoto, Japan; Seok-gwang Doo, Sungnam, Rep. of Korea

[73] Assignee: Samsung Electronics Co., Ltd., Suwon, Rep. of Korea

[21] Appl. No.: 08/902,924

[22] Filed: Jul. 30, 1997

[30] Foreign Application Priority Data

Jul. 30, 1996 [KR] Rep. of Korea ............. 96-31528
Oct. 16, 1996 [KR] Rep. of Korea ............. 96-46314
Jul. 3, 1997 [KR] Rep. of Korea ............. 97-30817

[51] Int. Cl.$^6$ .................................. H01M 10/08
[52] U.S. Cl. ................ 429/314; 429/317; 429/322; 429/324
[58] Field of Search .................. 429/314, 317, 429/322, 324

[56] References Cited

U.S. PATENT DOCUMENTS 5,152,903 10/1992 Neff et al. .................. 210/734
5,223,353 6/1993 Ohsawa et al. ............ 429/192
5,272,022 12/1993 Takami et al. ............. 429/197
5,401,599 3/1995 Tahara et al. .............. 429/218

FOREIGN PATENT DOCUMENTS 1-167309 7/1989 Japan .
2-21506 1/1990 Japan .
2-298504 12/1990 Japan .
2-298505 12/1990 Japan .

*Primary Examiner*—Maria Nuzzolillo
*Assistant Examiner*—Angela J. Martin
*Attorney, Agent, or Firm*—Foley & Lardner

[57] ABSTRACT

A polymer solid electrolyte that is useable in a lithium secondary cell comprising a polymer matrix, a polymerization initiator, an inorganic salt and a solvent. The polymer matrix is composed of a copolymer of a monomer having an amide group at a side chain and a polymer with an oxyethylene repeating unit. The polymer solid electrolyte has excellent conductivity and can easily be processed due to its good mechanical property.

22 Claims, No Drawings

POLYMER SOLID ELECTROLYTE AND LITHIUM SECONDARY CELL ADOPTING THE SAME

BACKGROUND OF THE INVENTION

1. Field of the Invention

The present invention relates to a polymer solid electrolyte and a lithium secondary cell adopting the same. More particularly, the invention relates to a polymer solid electrolyte having excellent ion conductivity which can be processed easily due to its excellent mechanical property and a lithium secondary cell adopting the same.

2. Description of Related Art

Secondary cells having high energy density, used as a driving source thereof, are required as portable electronic appliances such as camcorders, cellular phones, laptops, etc. become smaller and lighter. There are ten or more types of secondary cells including the nickel-cadmium cell, the nickel-hydrogen cell, the lithium ion cell, and the like. In particular, the lithium ion cell has been the focus as a next generation power source due to its long lifetime and high capacity.

Research into the lithium secondary cell began in the early 1970s, and there has been competition among worldwide research institutes to develop a lithium secondary cell for practical use. Sony Energy Tech. Co. developed a lithiumcarbon secondary cell having a lithium anode obtained from lithium-cobalt oxide and a carbon cathode. Also, Moly Energy Co. commercialized a lithium-carbon secondary cell having a lithium anode obtained from lithium nickel oxide and a carbon cathode.

Lithium compounds that are typically used as an cathode active material for lithium secondary cells include lithium cobalt oxide ($LiCoO_2$), lithium nickel oxide ($LiNiO_2$) or lithium manganese oxide ($LiMn_2O_4$). Lithium compounds that are typically employed as a anode active material include metallic lithium, lithium alloy or carbon. In addition, liquid or solid electrolyte can be used as an electrolyte. If a liquid electrolyte is used, however, many problems can occur which are related to stability, e.g., breakage of the cell caused by evaporation, and the like. In order to solve these problems, some have proposed to use solid electrolyte instead of the liquid electrolyte.

Solid electrolytes generally do not leak electrolyte solution and are easily processed. Thus, research into the solid electrolyte has been actively performed. There is a particularly high interest in a polymer solid electrolyte. Polymer solid electrolytes can be classified into: (i) a solid type without an organic electrolyte solution; and (ii) a gel type including organic electrolyte solution.

A crosslinked polyether substance is included in the solid type. The solid type electrolyte usually has a conductivity of about $10^{-4}$ S/cm. However, in order to apply the electrolyte to a cell, a conductivity of $10^{-3}$ S/cm or more is required. Thus, it is difficult to practically use the solid type electrolyte due to its insufficient conductivity and poor mechanical property.

On the other hand, the gel type solid electrolyte is of great interest and focus as a useful material of a secondary cell due to its conductivity of $10^{-3}$ S/cm or more and its sufficient mechanical intensity. For example, Japanese Laid-open Patent Publication No. 4-306560 discloses a polymer solid electrolyte including a copolymer of acrylonitrile and methyl acrylate or a copolymer of acrylonitrile and methyl methacrylate, support electrolyte salt and solvent such as propylene carbonate.

This kind of electrolyte however, has the following problems. First, the selection range of solvent used for manufacturing the electrolyte is very restricted. Second, the manufacturing of the electrolyte is difficult and high-temperature conditions of above 180° C. are required. Third, due to its poor ability of holding organic electrolyte solution (including the support electrolyte salt and solvent), the organic electrolyte solution may leak during the usage of cell.

As another example of the gel type solid electrolyte, Japanese Laid-open Patent Publication No. 3-207752 discloses a polymer solid electrolyte manufactured by irradiating ultraviolet rays onto a liquid composition including polyethylene glycol and/or dimethacrylate, support electrolyte salt and solvent. The electrolyte has excellent plasticity and poor conductivity of $10^{-4}$ S/cm or less, so that it is difficult to apply the electrolyte to a cell.

To solve the above problems by increasing conductivity, U.S. Pat. No. 5,463,179 introduces a rigid functional group such as an alkyl group in a polymer matrix, resulting in a stable three-dimensional space within the polymer matrix. The processing property thereof, however, is not suitable even if the conductivity is remarkably increased.

SUMMARY OF THE INVENTION

Thus, there exists a need to develop a polymeric solid electrolyte which does not suffer from the aforementioned difficulties. It is therefore an object of the present invention to provide a gel type polymer solid electrolyte having excellent conductivity and mechanical properties, and which does not leak an organic electrolyte solution included therein. It is an additional object of the present invention to provide a lithium secondary cell adopting the polymer solid electrolyte.

In accordance with these and other objects of the invention, there is provided a polymer solid electrolyte comprising a polymer matrix composed of a copolymer of polymerizable monomer represented by formula (1) and cross-linking agent represented by the formula (2).

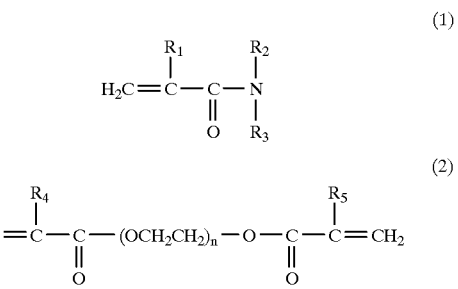

where $R_1$ is hydrogen or a methyl group, and $R_2$ and $R_3$ are each independently selected from the group consisting of hydrogen, $C_1$~$C_6$ alkyl group, —(R)N(R')$_2$ and —(R")OH, and $R_4$ and $R_5$ are each independently hydrogen or a methyl group, n is an integer between 3 and 30, wherein R, R' and R" are a $C_1$~$C_6$ alkyl group.

In accordance with an additional object of the invention, there is provided a lithium secondary cell including the above-described polymer solid electrolyte. Such a lithium secondary cell provides improvement in the operating voltage, lifetime and energy density.

In accordance with an additional object of the invention, there is provided a method of making a polymer solid electrolyte comprising mixing a polymerizable monomer of formula (1) above, with a cross-linking agent of formula (2), adding an ionic inorganic salt, adding a solvent, and then adding a polymerization initiator. In accordance with yet another object of the invention, there is provided a method of making a lithium secondary cell comprising mixing the above-described electrolyte solution with an active material for use as a lithium cathode and a conductive agent, coating this mixture on a cathode current collector, heating to form a composite cathode layer, mixing carbon powder and the above-described electrolyte solution on an anode current collector, heating to form a composite anode layer, forming a polymer solid electrolyte layer by coating the above-described electrolyte solution on a thin film and completing polymerization, and then placing the polymer solid electrolyte layer between the anode current collector and the cathode current collector.

DETAILED DESCRIPTION OF THE INVENTION

A polymer solid electrolyte according to the present invention comprises a polymer matrix, a polymerization initiator and an electrolyte solution. The electrolyte solution can include a solvent. Preferably, the solvent includes a non-aqueous solvent with high dielectric constant or a non-aqueous solvent (first solvent) and a second solvent having an amide group.

The polymer matrix usually is composed of a polymer formed by the copolymerization between a polymerizable monomer of formula (1) and a cross-linking agent of formula (2). The content of the polymerizable monomer is 10–15 wt %, and the content of the cross-linking agent is 5–15 wt %, based on the weight of the polymer solid electrolyte.

A mixing ratio of the polymerizable monomer (1) and the cross-linking agent (2) is preferably 1:9~9:1 based on weight, and the mechanical property and conductivity thereof are best when the monomer and cross-linking agent are used in the range of the above mixing ratio.

Any polymerization initiator can be used that is capable of initiating the polymerization of a polymerizable monomer of formula (1) and a cross-linking agent of formula (2). The content of the polymerization initiator preferably is within the range of from 0.5~1.5 wt %, and the content of the electrolyte solution preferably is within the range of from 68.5~84.5 wt %, based on the weight of the polymer solid electrolyte. The electrolyte solution may be composed of a solvent and an inorganic salt, and the content of the inorganic salt can be within the range of from 6~17 wt %, based on the total weight of the electrolyte solution. Also, as the solvent, a non-aqueous solvent can be used independently, or a mixture of a non-aqueous aqueous solvent and a solvent containing an amide group can be used.

Examples of the useful polymerizable monomer shown in formula (1) include acryl amide, N,N-dimethylacryl amide, N,N-diethylacryl amide, N-isopropylacryl amide, N,N-dimethylaminopropylacryl amide, and acryloyl morpholine. Among these, N-isopropylacryl amide and acryloyl morpholine are preferred.

Examples of the useful cross-linking agent of formula (2) include polyethyleneglycol diacrylate and polyethyleneglycol dimethacrylate, wherein the number of the repeating unit of oxyethylene may be within the range of from 1~30, preferably, 3~30. If n is 1 or 2, the plasticity of the resulting polymer solid electrolyte slightly decreases.

In the present invention, the solvent of the electrolyte solution usually is a non-aqueous solvent. Preferably, the non-aqueous solvent is capable of being dissociated due to its high dielectric constant and polarity. Also, a mixture of the non-aqueous solvent (first solvent) and a second solvent that is capable of being contained to a great extent within a matrix due to its excellent affinity to the polymer matrix may be used. In this case, the solvent is included so as to maintain the polymer solid electrolyte in a gel state. Preferably, the content of the electrolyte solution including the inorganic salt and the solvent is within the range of from 68.5–84.5 wt %, based on the weight of the polymer solid electrolyte.

As the first solvent, a solvent showing no phase separating phenomenon when mixed with the compound of formula (1) and (2) is preferred. Particularly, it is preferred to use at least one solvent selected from propylene carbonate, ethylene carbonate, γ-butyrolactone, 1,3-dioxolane, dimethoxyethane, dimethyl carbonate, diethyl carbonate, tetrahydrofuran (THF), dimethylsulfoxide and polyethyleneglycol dimethylether.

A solvent having an amide group such as the amide group in the polymerizable monomer of Formula (1) can be used as the second solvent. For example, the second solvent can include any solvent selected from N,N-dimethylactamide, N,N-diethylacetamide, N,N-dimethylformamide and N,N-diethylformamide.

When the first solvent is used together with the second solvent having an excellent affinity to the polymer matrix, the electrolyte solution is evenly distributed within the network structure of the polymer matrix and the viscosity of the electrolyte solution is lowered thereby improving the ion conductivity of a support electrolyte salt being dissolved within the solvent.

Preferably, the first solvent and the second solvent are used in a mixing ratio within the range of from 1:3–3:1 based on volume, more preferably, 1:1 based on volume. If the mixing ratio of the second solvent with respect to the first solvent is above this range, the mechanical strength of the electrolyte is markedly decreased, so that the electrolyte is fragile during the cell assembly. Meanwhile, if the mixing ratio thereof is below the range, the ion conductivity of the electrolyte decreases and the electrolyte hardens.

Any inorganic salt can be used in the electrolyte solution so long as it is compatible with the solvent. Preferably, the ionic inorganic salt is an ionic lithium salt selected from the group lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethansulfonylamide ($LiN(CF_3SO_2)_2$).

Preferably, the content of the ionic inorganic salt is within the range of from 6~17 wt. % based on the weight of the electrolyte solution. In addition, the concentration of the ionic inorganic salt with respect to the solvent preferably is 0.5~1.5M. Here, if the concentration of the ionic inorganic salt exceeds 1.5M, mobility of the lithium ions is decreased and the ion conductivity is sharply decreased. On the contrary, if the concentration of the ionic inorganic salt is less than 0.5M, the number of ions participating in the movement of the lithium ions is decreased, thereby decreasing the ion conductivity.

The polymer solid electrolyte according to the present invention can be made using any method known in the art. Preferably, the polymer solid electrolyte is obtained through the following steps.

First, a polymerizable monomer having an amide group as a side chain, (polymer of formula (1)) and polyethyleneglycol diacrylate or dimethacrylate (cross-linking agent of formula (ii)) are mixed with a weight ratio of 1:9~9:1, and then an ionic inorganic salt and a solvent are added to the mixture to produce a polymer solid electrolyte composition.

The polymer electrolyte composition then can be coated on a support such as aluminum thin film and mylar film using a doctor blade or a bar coater, and then polymerization is performed to complete a polymer solid electrolyte according to the present invention.

Polymerization typically is completed by addition of a polymerization initiator, and then subjecting the mixture to a suitable form of radiation. If thermal initiators are used, the mixture is subjected to heat, and if photo initiators are used, the mixture is subjected to light. Any polymerization initiator can be used that is capable of initiating the polymerization. Preferably, the polymerization initiator includes a photo polymerization or thermal polymerization initiator. Suitable photopolymerization initiators include 2-hydroxy-2-methyl-1-phenylpropane, 1-hydroxycyclohexylphenylketone, 1-(4-isoprophlphenyl)-2-hydroxy-2-methylpropane), benzyldimethylketal, benzoin, benzoinethylether. Suitable thermal polymerization initiator include azobisisobutyronitrile and benzoyl peroxide.

The polymer solid electrolyte preferably is used in a lithium secondary cell. A lithium secondary cell adopting the polymer solid electrolyte according to a preferred embodiment of the present invention, and a manufacturing method therefor is described below.

First, an active material for a lithium cathode selected from lithium manganese oxide, lithium nickel oxide and lithium cobalt oxide, and a conductive agent are added to the composition containing (i) the polymer solid electrolyte including the polymerizable monomer of the formula (1), the cross-linking agent of the formula (2), and the polymerization initiator, and (ii) the electrolyte solution which contains the inorganic salt and the solvent. The active material, the conductive agent and the composition containing the polymer solid electrolyte then are mixed well to form a reaction mixture.

The reaction mixture then is coated on a cathode current collector. After coating the reaction mixture on an cathode current collector, heating is performed to form a composite cathode layer.

The anode can be prepared as follows. A mixture of carbon powder and the composition for the polymer solid electrolyte is coated on an anode current collector and then heated to form a composite anode layer.

The composite cathode layer, a polymer solid electrolyte layer and the composite anode layer then are overlapped, and the overlapped layers are combined by a thermal process or applying a predetermined pressure, thereby completing a lithium secondary cell of the present invention.

Examples of the present invention will now be described, however, the present invention is not limited to the following examples.

EXAMPLE 1

N-isopropylacryl amide and polyethyleneglycol dimethacrylate were mixed with a weight ratio of 3:1, and then propylene carbonate including 1M $LiBF_4$ and benzoinethylether were added to the mixture, resulting in a polymer electrolyte composition. After coating the composition on a glass substrate, the substrate was subjected to ultraviolet rays for 30 minutes to obtain a gel type polymer solid electrolyte.

EXAMPLE 2

A gel type polymer solid electrolyte was obtained by the same method as that described in Example 1, except N-acryloyl morpholine was used instead of N-isopropylacryl amide.

EXAMPLE 3

A gel type polymer solid electrolyte was obtained by the same method as that described in Example 1, except γ-butyrolactone was used instead of propylene carbonate.

EXAMPLE 4

Ethylene carbonate containing 1M $LiPF_6$ and N,N-dimethylacetamide were mixed with 1:1 volumetric ratio to prepare an electrolyte solution. N-isopropylacrylamide and polyethyleneglycol dimethacrylate then were added to the electrolyte solution in a weight ratio of 3:1, and then benzoylethylether was mixed thereinto.

The above composition was coated on a glass substrate and then subjected to ultraviolet rays for about 30 minutes to be polymerized, resulting in a gel type polymer solid electrolyte.

EXAMPLE 5

A gel type polymer solid electrolyte was produced by the same method as that described in Example 4 except N,N-dimethylformamide was used instead of N,N-dimethylacetamide.

EXAMPLE 6

A gel type polymer solid electrolyte was produced by the same method as that described in Example 4 except N,N-diethylacetamide was used instead of N,N-dimethylacetamide.

EXAMPLE 7

A gel type polymer solid electrolyte was produced by the same method as that described in Example 4 except N,N-diethylformamide was used instead of N,N-dimethylacetamide.

EXAMPLE 8

A gel type polymer solid electrolyte was produced by the same method as that described in Example 4 except the concentration of $LiPF_6$ was 0.5M.

EXAMPLE 9

A gel type polymer solid electrolyte was produced by the same method as that described in Example 4 except the concentration of $LiPF_6$ was 1.0M.

EXAMPLE 10

A gel type polymer solid electrolyte was produced by the same method as that described in Example 4 except the concentration of $LiPF_6$ was 1.5M.

EXAMPLE 11

A gel type polymer solid electrolyte was produced by the same method as that described in Example 4 except ethylene carbonate and N,N-dimethylacetamide were mixed with a volumetric ratio of 1:3.

EXAMPLE 12

A gel type polymer solid electrolyte was produced by the same method as that described in Example 4 except ethylene carbonate and N,N-dimethylacetamide was mixed with a volumetric ratio of 3:1.

EXAMPLE 13

A gel type polymer solid electrolyte was produced by the same method as that described in Example 4 except propylene carbonate was used instead of ethylene carbonate.

EXAMPLE 14

A gel type polymer solid electrolyte was produced by the same method as that described in Example 4 except 1M $LiBF_4$ was used instead of 1M $LiPF_6$.

Performance tests of the polymer solid electrolytes obtained by the above examples were conducted by the following methods.

1) Ion Conductivity

A gel type film having a diameter of 13 mm was prepared from respective polymer solid electrolytes obtained through Examples 1 to 14. After placing the film between two stainless steel disks, the ion conductivities were measured using an impedance analyzer adopting an alternating current impedance method.

2) Flexibility

A gel type film was wound around a stainless steel rod having a diameter of 5 mm. Then, the film was unwound from the rod. This process was repeated about 10 times, and then the appearance of the film was visually checked. Here, the visual appearance of the film was evaluated into one of three levels: excellent, good or poor, wherein "excellent" represents a state in which no defects are visually detected in the gel type film, "good" represents a state in which very trivial defects are detected, which would not have an adverse effect in usage, and "poor" represents a state in which defects are visually detected.

3) Leakage of Electrolyte Solution

A filter paper was attached to the gel type film for a predetermined time. Then, it was observed whether the electrolyte solution leaks or not.

The results of the above performance tests with respect to Examples 1–14 are shown in Table 1.

TABLE 1

| Examples | ion conductivity (S/cm) | flexibility | leakage of electrolyte solution |
|---|---|---|---|
| 1 | $1.4 \times 10^{-3}$ | good | X |
| 2 | $1.6 \times 10^{-3}$ | good | X |
| 3 | $2.0 \times 10^{-3}$ | good | X |
| 4 | $4.02 \times 10^{-3}$ | excellent | X |
| 5 | $2.17 \times 10^{-3}$ | excellent | X |
| 6 | $1.89 \times 10^{-3}$ | excellent | X |
| 7 | $1.64 \times 10^{-3}$ | excellent | X |
| 8 | $3.86 \times 10^{-3}$ | excellent | X |
| 9 | $4.02 \times 10^{-3}$ | excellent | X |
| 10 | $3.53 \times 10^{-3}$ | excellent | X |
| 11 | $2.57 \times 10^{-3}$ | good | X |
| 12 | $2.14 \times 10^{-3}$ | poor | X |
| 13 | $1.4 \times 10^{-3}$ | excellent | X |
| 14 | $1.68 \times 10^{-3}$ | good | X |

As shown in Table 1, the ion conductivities of the polymer solid electrolyte according to Examples 1–14 were improved. Also, flexibility of the electrolytes manufactured in Examples 1–11 and 13–14 was good. However, in the case of Example 12, the flexibility of the electrolyte was decreased due to the formation of a hard polymer gel.

Also, leakage of the electrolyte solution was not found in any of the electrolytes manufactured by Examples 1–14. Thus, it can be found that the organic electrolyte solution holding capacity of the gel type polymer solid electrolytes is excellent.

The polymer solid electrolyte according to the present invention provides the following effects: 1) the organic electrolyte solution hardly leaks from the electrolyte; 2) the electrolyte can be easily processed due to its excellent mechanical properties such as flexibility and plasticity; 3) the electrolyte can be applied to a lithium secondary cell requiring excellent ion conductivity due to its high conductivity of $10^{-3}$ S/cm or more.

The invention has been described with reference to particularly preferred examples and embodiments. Those skilled in the art appreciate, however, that various modifications can be made to the invention without significantly departing from the spirit and scope thereof. All documents described herein are incorporated by reference herein in their entirety.

What is claimed is:

1. A polymer solid electrolyte comprising:
   a polymer matrix composed of a copolymer of a polymerizable monomer represented by the formula (1) and a cross-linking agent represented by the formula (2);
   a polymerization initiator; and
   an electrolyte solution containing an inorganic salt and a solvent,

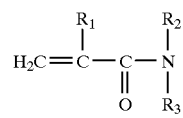

(1)

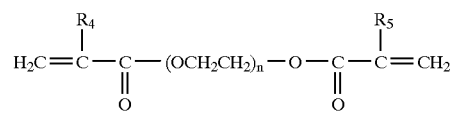

(2)

where $R_1$ is selected from hydrogen or a methyl group, $R_2$ and $R_3$ each are independently selected from the group consisting of hydrogen, $C_1\sim C_6$ alkyl, $-(R)N(R')_2$ and $-(R'')OH$, $R_4$ and $R_5$ each are independently selected from hydrogen or methyl, n is an integer between 3 and 30, and wherein R, R' and R" each are a $C1\sim C_6$ alkyl group.

2. A polymer solid electrolyte as claimed in claim 1, wherein the polymerizable monomer represented by the formula (1) and the cross-linking agent represented by the formula (2) are mixed together in a mixing ratio within the range of from 1:9~9:1, based on weight.

3. A polymer solid electrolyte as claimed in claim 1, wherein the polymerizable monomer represented by the formula (1) is at least one selected from the group consisting of acryl amide, N,N-dimethylacryl amide, N,N-diethylacryl amide, N-isopropylacryl amide, N,N-dimethylaminopropylacryl amide, and acryloyl morpholine.

4. A polymer solid electrolyte as claimed in claim 1, wherein the cross-linking agent represented by formula (2) is selected from polyethyleneglycol diacrylate or polyethyleneglycol dimethacrylate.

5. A polymer solid electrolyte as claimed in claim 1, wherein the solvent is a non-aqueous solvent having a high dielectric constant.

6. A polymer solid electrolyte as claimed in claim 1, wherein the solvent is a mixture of a non-aqueous solvent with a high dielectric constant and a solvent having an amide group.

7. A polymer solid electrolyte as claimed in claim 5, wherein the non-aqueous solvent is at least one selected from the group consisting of propylene carbonate, ethylene carbonate, γ-butyrolacetone, 1,3-dioxolane, dimethoxyethane, dimethylcarbonate, diethylcarbonate, tetrahydrofuran (THF), dimethylsulfoxide and polyethyleneglycol dimethylether.

8. A polymer solid electrolyte as claimed in claim 6, wherein the solvent having the amide group is at least one selected from the group consisting of N,N-dimethylacetamide, N,N-diethylacetamide, N,N-dimethylformamide and N,N-diethylformamide.

9. A polymer solid electrolyte as claimed in claim 6, wherein the mixing ratio of the non-aqueous solvent and the solvent having the amide group is 1:3~3:1 based on volume.

10. A polymer solid electrolyte as claimed in claim 6, wherein the mixing ratio of the non-aqueous solvent and the solvent having the amide group is 1:1 based on volume.

11. A polymer solid electrolyte as claimed in claim 1, wherein the inorganic salt is at least one selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethansulfonylamide ($LiN(CF_3SO_2)_2$).

12. A polymer solid electrolyte as claimed in claim 1, wherein the content of the polymerizable monomer represented by formula (1) is within the range of from 10~15 wt %, based on the weight of the polymer solid electrolyte.

13. A polymer solid electrolyte as claimed in claim 1, wherein the content of the cross-linking agent represented by formula (2) is within the range of from 5~15 wt %, based on the weight of the polymer solid electrolyte.

14. A polymer solid electrolyte as claimed in claim 1, wherein the content of the polymerization initiator is within the range of from 0.5~1.5 wt %, based on the weight of the polymer solid electrolyte.

15. A polymer solid electrolyte as claimed in claim 1, wherein the content of the electrolyte solution is within the range of from 68.5~84.5 wt %, based on the weight of the polymer solid electrolyte.

16. A polymer solid electrolyte as claimed in claim 1, wherein the content of the inorganic salt is within the range of from 6~17 wt % based on the weight of the electrolyte solution.

17. A lithium secondary cell comprising the polymer solid electrolyte as claimed in claim 1.

18. A method of making a polymer solid electrolyte comprising:
mixing a polymerizable monomer of formula (1) with a cross-linking agent of formula (2);
adding an ionic inorganic salt;
adding a solvent; and
adding a polymerization initiator, $$H_2C=\underset{\underset{O}{\parallel}}{\overset{R_1}{C}}-\underset{R_3}{\overset{R_2}{C}}-N \quad (1)$$

$$H_2C=\underset{\underset{O}{\parallel}}{\overset{R_4}{C}}-C-(OCH_2CH_2)_n-O-\underset{\underset{O}{\parallel}}{C}-\overset{R_5}{C}=CH_2 \quad (2)$$

where $R_1$ is selected from hydrogen or a methyl group, $R_2$ and $R_3$ each are independently selected from the group consisting of hydrogen, $C_1$~$C_6$ alkyl, —(R)N(R')$_2$ and —(R")OH, $R_4$ and $R_5$ each are independently selected from hydrogen or methyl, n is an integer between 3 and 30, and wherein R, R' and R" each are a $C_1$~$C_6$ alkyl group.

19. The method as claimed in claim 18, wherein the polymerizable monomer represented by the formula (1) and the cross-linking agent represented by the formula (2) are mixed together in a mixing ratio within the range of from 1:9~9:1, based on weight.

20. A method of making a lithium secondary cell comprising:
mixing the polymer solid electrolyte as claimed in claim 1 with (i) an active material for use as a lithium cathode and (ii) a conductive agent;
coating this mixture on a cathode current collector;
heating to form a composite cathode layer;
mixing carbon powder and the polymer solid electrolyte on an anode current collector;
heating to form a composite anode layer;
forming a polymer solid electrolyte layer by coating the polymer solid electrolyte on a thin film and completing polymerization; and
placing the polymer solid electrolyte layer between the composite anode layer and the composite cathode layer.

21. A secondary cell, comprising:
a cathode;
an anode; and
a first solid polymer electrolyte between the anode and the cathode; wherein
at least one of the anode and the cathode comprises an active material and the first solid polymer electrolyte.

22. A secondary cell of claim 21, wherein:
the cathode comprises a cathode current collector, the first solid polymer electrolyte, and a cathode active material selected from lithium manganese oxide, lithium nickel oxide or lithium cobalt oxide;
the anode comprises an anode current collector, the first solid polymer electrolyte, and an anode active material selected from lithium, lithium alloy or carbon;
and the first solid polymer electrolyte comprises
a polymerization initiator;
an electrolyte solution containing an inorganic salt and a solvent; and
a polymer electrolyte medium having a polymer matrix comprised of
a copolymer of a polymerizable monomer expressed by the formula (1)
and a cross-linking agent expressed by the formula (2);

$$H_2C=\underset{\underset{O}{\parallel}}{\overset{R_1}{C}}-\underset{R_3}{\overset{R_2}{C}}-N \quad (1)$$

$$H_2C=\underset{\underset{O}{\parallel}}{\overset{R_4}{C}}-C-(OCH_2CH_2)_n-O-\underset{\underset{O}{\parallel}}{C}-\overset{R_5}{C}=CH_2 \quad (2)$$

where $R_1$ is hydrogen or a methyl group, and $R_2$ and $R_3$ are each independently one selected from the group consisting of hydrogen, methyl, ethyl, propyl, dialkylaminopropyl (—$C_3H_6N(R')_2$) and hydroxyethyl ($CH_2CH_2OH$) groups, and $R_4$ and $R_5$ are each independently hydrogen or a methyl group, and n is an integer from 3 to 30, wherein R' is a $C_1$~$C_5$ alkyl group.

* * * * *